US011748922B2

(12) United States Patent
Stiebeiner et al.

(10) Patent No.: US 11,748,922 B2
(45) Date of Patent: Sep. 5, 2023

(54) AUTOMATED CHANNEL CROSS-SECTION MEASUREMENT FOR MICROFLUIDIC CHANNELS

(71) Applicant: FARO Technologies, Inc., Lake Mary, FL (US)

(72) Inventors: Ariane Stiebeiner, Stuttgart (DE); Georgios Balatzis, Fellbach (DE); Stefan Wagner, Renningen (DE)

(73) Assignee: FARO Technologies, Inc., Lake Mary, FL (US)

( * ) Notice: Subject to any disclaimer, the term of this patent is extended or adjusted under 35 U.S.C. 154(b) by 319 days.

(21) Appl. No.: 17/189,315

(22) Filed: Mar. 2, 2021

(65) Prior Publication Data

US 2021/0287408 A1 Sep. 16, 2021

Related U.S. Application Data

(60) Provisional application No. 62/987,934, filed on Mar. 11, 2020.

(51) Int. Cl.
*G06T 11/00* (2006.01)
*G06T 7/00* (2017.01)

(52) U.S. Cl.
CPC .......... *G06T 11/005* (2013.01); *G06T 7/0012* (2013.01)

(58) Field of Classification Search
None
See application file for complete search history.

(56) References Cited

U.S. PATENT DOCUMENTS

2016/0163048 A1\* 6/2016 Yee ........................ A61B 6/032
382/131
2020/0261157 A1\* 8/2020 Chen ...................... A61B 34/20

FOREIGN PATENT DOCUMENTS

| CN | 109916935 A | * | 6/2019 |
| CN | 110763169 A | * | 2/2020 | ............ G01B 15/00 |
| CN | 110763169 A | | 2/2020 | |

(Continued)

OTHER PUBLICATIONS

Extended European Search Report for Application No. 21161361.7 dated Sep. 28, 2021.

(Continued)

*Primary Examiner* — Miya J Cato
*Assistant Examiner* — Pawan Dhingra
(74) *Attorney, Agent, or Firm* — McCarter & English, LLP; Dave S. Christensen; David K. Kincaid

(57) ABSTRACT

Provided are embodiments of a method for performing automatic analysis of cross-sections of micro-channels. Embodiments includes receiving tomography scan data, aligning the tomography scan data, and extracting channels from a slice of the tomography scan data to create an isolated slice of the extracted channel. Embodiments also include determining surface voxels for the extracted channels, and determining an area defined within the surface voxels for each of the extracted channels. Embodiments include determining a contribution of the surface voxels for each of the extracted channels to the cross-section of the extracted channels, and outputting cross-section information based on the contribution of the surface voxels. Also provided are embodiments of a system for performing automatic analysis of cross-sections of micro-channels.

18 Claims, 8 Drawing Sheets

(56) References Cited

FOREIGN PATENT DOCUMENTS

CN  109916935 A  6/2021

OTHER PUBLICATIONS

Synopsys, "Advanced 3D image processing tools and features to enhance all your 3D image visualization and analysis workflows" Image to 3D Models Software, Simpleware Solutions, https://www.synopsys.com/simpleware.html [retreived from internet Feb. 21, 2020] pp. 1-12.

* cited by examiner

200

AUTOMATED CHANNEL CROSS-SECTION MEASUREMENT FOR MICROFLUIDIC CHANNELS

CROSS-REFERENCE TO RELATED APPLICATIONS

This application claims the benefit of U.S. Provisional Application No. 62/987,934, filed Mar. 11, 2020, and entitled "Automated Channel Cross-Section Measurement For Microfluidic Channels", the content of which is incorporated herein by reference in its entirety.

BACKGROUND

The invention relates generally to an imaging system, more particularly to a method and apparatus for use of the imaging system in analysis of internal structures.

In today's environment, various imaging technologies can be used to obtain scan data which can be used to reconstruct images of the object for further analysis. Common imaging technologies include computed tomography (CT) scans and magnetic resonance imaging (MRI) scans.

CT uses an x-ray source which projects a beam onto an imaging plane. The x-ray beam passes through the object being imaged, such as a patient or a microfluidic device. The beam is attenuated by the object and received by an array of radiation detectors. The intensity of the attenuated beam radiation received at the detector array is dependent upon the attenuation of the x-ray beam by the object. Each detector of the array produces an electrical signal that measures the attenuation of the beam at each detector location. The attenuation measurements from all of the detectors are acquired to produce an image of the object.

MRI detects magnetic resonance signals from nuclei (e.g. proton) in an object and can be used to reconstruct a tomographic image of a desired slice or position of the object. MRI systems are often used in medical environments due to its non-invasiveness and use of non-ionizing radiation which limits any tissue damage caused by the system. The digital images and measurements that are obtained can provide reliable scans for examination.

Using CT, MRI, or other scanning technology, the internal structures of a sample can be examined. In particular, the characteristics of micro channels can be inspected. The presence or absence of an obstruction in the internal structure that can affect the fluid flow within a channel can be determined.

Conventional systems and methods require manual analysis of the collected data from the scanner. In addition, the characteristics of the scanned object are not as accurate or precise as that provided by the techniques described herein. The inaccuracies in the channel characteristics can have detrimental consequences.

In the medical environment, the evaluation of the scan data for blood vessels has been restricted to visual inspection by trained personnel such as physicians and technicians. The subjectivity of their inspections can lead to misinterpretation of the results which can lead to undesired consequences. The techniques described herein provide for an automated analysis of microchannel cross-sections that can increase the reliability of the results and the consistency of the examinations significantly.

In industrial applications, problems or variabilities in injection molding or other manufacturing processes can cause the narrowing or ceiling deformities of the channel which can impact the performance of a microfluidic device. It is desired to detect these abnormalities and characteristics in order to improve the processes or remove the microfluidic devices from the sample that are outside of the desired specification.

Accordingly, while existing techniques are suitable for their intended purposes, what is needed are imaging analysis techniques having certain features of embodiments of the present invention.

BRIEF DESCRIPTION

According to one embodiment, a method for performing automatic cross-section analysis of a channel is provided. The method includes receiving tomography scan data; aligning the tomography scan data; extracting channels from a slice of the tomography scan data to create an isolated slice of the extracted channels; determining surface voxels for the extracted channels; determining an area defined within the surface voxels for each of the extracted channels; determining a contribution of the surface voxels for each of the extracted channels to the cross-section of the extracted channels; and outputting cross-section information based on the contribution of the surface voxels.

In addition to one or more of the features described herein, or as an alternative, further embodiments include determining a cross-section for each position in the extracted channels based on a voxel size and voxel gray values.

In addition to one or more of the features described herein, or as an alternative, further embodiments include determining the contribution of the surface voxels to the cross-section of the extracted channels comprises weighting each surface voxel based on its gray value and summing over all surface voxels for the cross-section of the extracted channels.

In addition to one or more of the features described herein, or as an alternative, further embodiments include repeating the method across a length of the extracted channels.

In addition to one or more of the features described herein, or as an alternative, further embodiments include marking positions of the extracted channels based at least in part on the determined cross-sections for the length of the extracted channel.

In addition to one or more of the features described herein, or as an alternative, further embodiments include determining minimum values and maximum values for the cross-section of the extracted channel.

In addition to one or more of the features described herein, or as an alternative, further embodiments include using scan data of a microfluidic device.

In addition to one or more of the features described herein, or as an alternative, further embodiments include using scan data of a physiological sample.

In addition to one or more of the features described herein, or as an alternative, further embodiments include segmenting the extracted channel into a plurality of segments; and approximating each of the plurality of segments to a geometric shape.

In addition to one or more of the features described herein, or as an alternative, further embodiments include aligning a direction of each slice perpendicular to an axis of the channel determined by an axis of the geometric shape approximated to the plurality of segments.

According to another embodiment, a system for performing automatic analysis of cross-sections of micro-channels is provided. The system includes a data acquisition system for obtaining a tomography scan of a channel; a computing system coupled to the data acquisition system; and a processor coupled to the computing system. The processor is configured to receive tomography scan data; align the tomography scan data; extract channels from the tomography scan data; determine surface voxels for the extracted channels; determine an area defined within the surface voxels for each of the extracted channels; determine a contribution of the surface voxels to the cross-section of the extracted channel; and output a cross-section measurement based on the contribution of the surface voxels.

In addition to one or more of the features described herein, or as an alternative, further embodiments include a processor that is further configured to determine a cross-section for each position in the extracted channels based on voxel size and voxel gray values.

In addition to one or more of the features described herein, or as an alternative, further embodiments include determining the contribution of the surface voxels to the cross-section of the extracted channels comprises the processor configured to weight each surface voxel based on its gray value and sum over all surface voxels for the cross-section of the extracted channels.

In addition to one or more of the features described herein, or as an alternative, further embodiments include a processor that is configured to repeat the method across a length of the extracted channels.

In addition to one or more of the features described herein, or as an alternative, further embodiments include a processor that is configured to mark critical positions of each of the extracted channels based at least in part on the determined cross-sections for the length of the extracted channels.

In addition to one or more of the features described herein, or as an alternative, further embodiments include a processor that is configured to determine minimum values and maximum values for the cross-section of the extracted channels.

In addition to one or more of the features described herein, or as an alternative, further embodiments include processing scan data of a microfluidic device.

In addition to one or more of the features described herein, or as an alternative, further embodiments include processing scan data of a physiological sample.

In addition to one or more of the features described herein, or as an alternative, further embodiments include a processor that is configured to segment the channel into a plurality of segments; and approximate each of the plurality of segments to a geometric shape.

In addition to one or more of the features described herein, or as an alternative, further embodiments include a processor that is configured to align a direction of each slice perpendicular to an axis of the channel determined by an axis of the geometric shape approximated to the plurality of segments.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
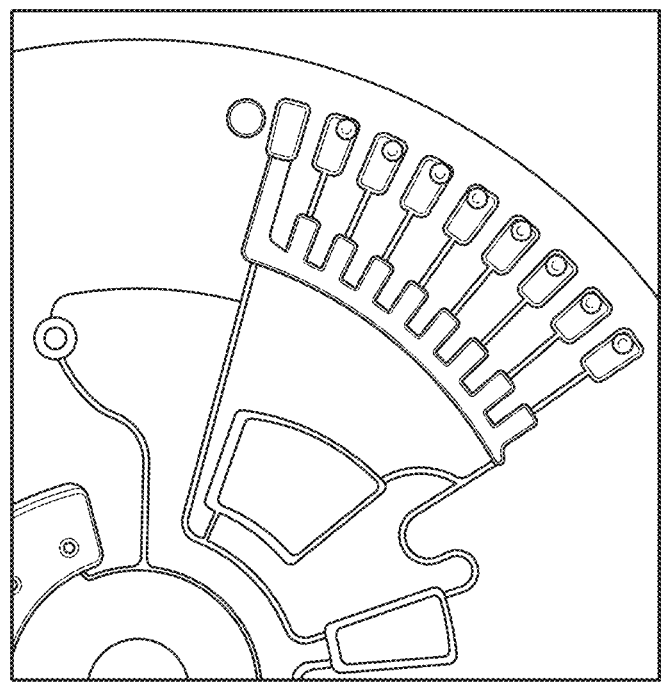
FIG. 1 depicts an example of a microfluidic device having multiple channels that are analyzed using the techniques described herein.

Turning now to an overview of technologies that are more relevant to aspects of the disclosure, microfluidic channels have at least one dimension of the channel which is in the range of a micrometers or tens of micrometers. At this scale, known techniques face challenges in obtaining accurate scan data. In a non-limiting example, a segment of a microfluidic device is shown in FIG. 1. For example, microfluidic devices are composed of chambers and connecting channels with widths on the order of 10-500 micrometers and heights in the same order of magnitude. The functionality of these devices is closely related to the fluidic properties of these microchannels. The cross-sections are a desired property of such a device and are inspected with a high degree of accuracy because the cross-section of the channel governs the fluidic properties of the channel of the device.

Due to the manufacturing process of the microfluidic devices, including high-precision milling, the channels can deviate largely from their intended shape. This makes it more difficult to measure the channel cross-sections since no assumptions about the shape of the cross-section can be made.

Additionally, these microfluidic devices only fulfill their purpose when they are sealed with, for example, an additional layer of a substrate. The sealing process can influence the channel geometries further and deviations may be undetected if inspections are not performed to detect any defects.

Inspection of the closed structures after the sealing process is challenging due to lack of mechanical or optical access to the channel interior. Methods used to inspect channels before sealing like, atomic force microscopy or confocal microscopy for example, can therefore not be used after sealing.

The techniques described herein provide for automatically evaluating channels, including the cross-section of blood vessels on a computed tomography (CT) scan for example. The cross-sectional information can provide insight into the reliability of the microchannel. From the tomography scan individual channels are detected. For each identified channel, the cross-section along the channel is calculated based on the voxel size and voxel gray values. Using these position-dependent values for the channel cross-sections, the minimum and maximum dimension along each channel can be determined. This information can potentially identify channels exhibiting irregularities with high accuracy.

Figure 2:
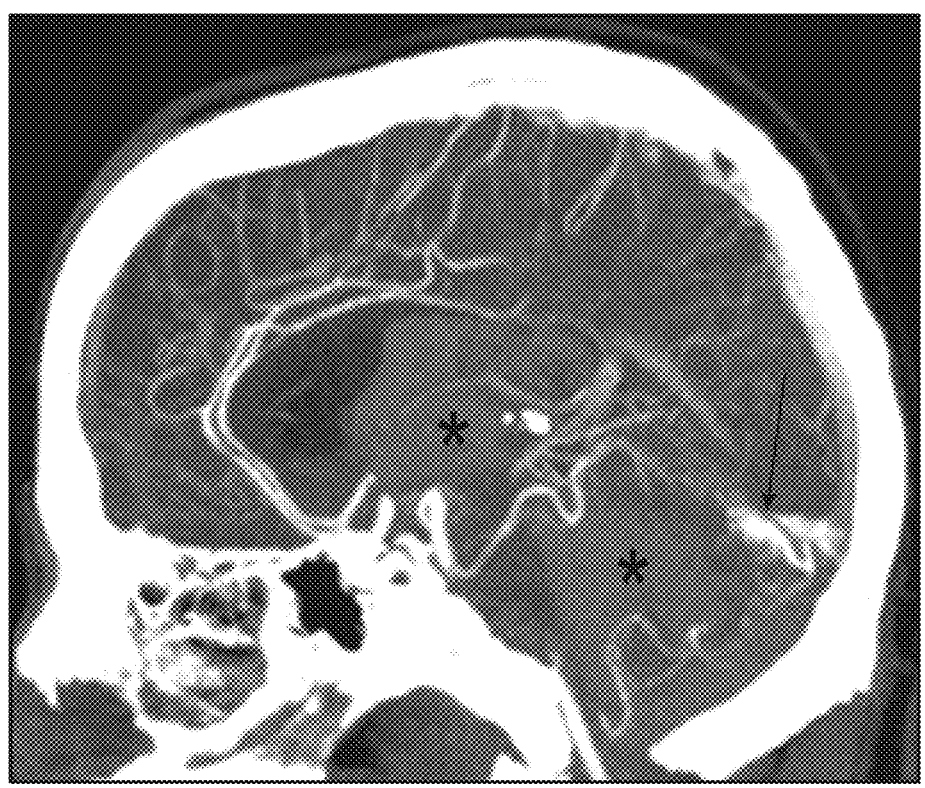
FIG. 2 depicts an example of a human brain with multiple blood vessels to be analyzed using the techniques described herein.

In the medical context, CT scanning allows trained medical professionals to create images of a patient's organs, bones or other tissue. Referring to FIG. 2, a scan of a patient 200 is shown. The internal characteristics can be examined using the techniques described herein. For example, by evaluating the scan data technology can be used to detect aneurysms or thrombi in the blood vessels which can cause strokes or inhibit the brain function. By monitoring the cross-section of, for example, blood vessels over a period of time the conditions of a patient can be detected. However, the evaluation of the scan results up to now has been restricted to visual inspection by the responsible physician leaving the opportunity to misinterpret the data. The techniques described herein can reduce the misinterpretation of the image data given the improved cross-sectional data analysis for blood vessels.

In today's environment, the CT scanning and analysis is largely a manual process, and the analysis of the cross-section of a sealed device can present challenges. Embodiments provide advantages in acquiring accurate channel cross-sections using the techniques described herein. Embodiments provide further advantages in acquiring cross-section information of micro-fluidic channels using the techniques described herein.

Turning now to an overview of the aspects of the disclosure, one or more embodiments address the above-described shortcomings of the prior art by automating the analysis of micro-channels to a high degree of accuracy. The above-described aspects of the invention address the shortcomings of the prior art by accounting for the surface voxel contribution when determining the cross-section of a channel. This allows for more accurate channel data to be extracted from the scan.

Figure 3:
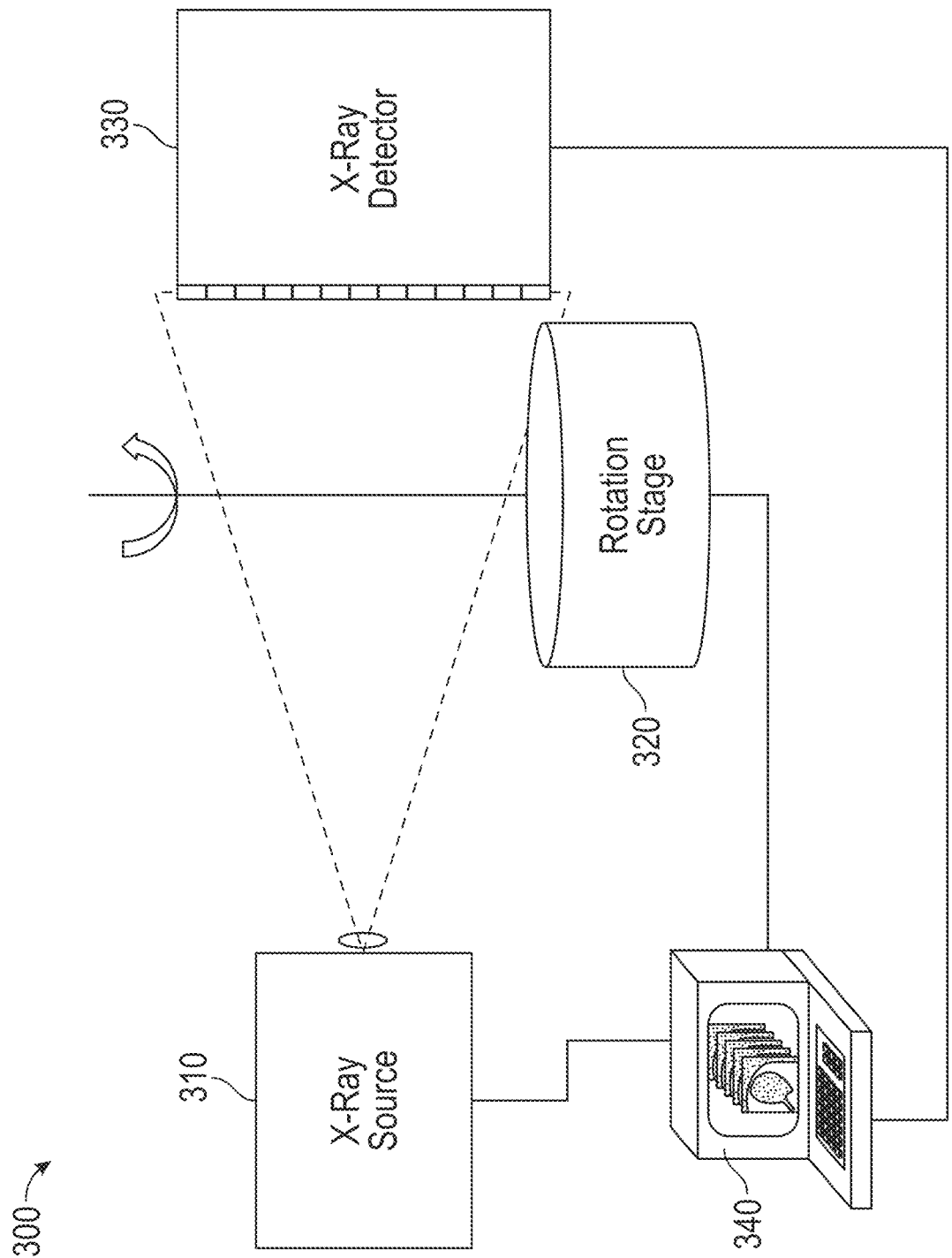
FIG. 3 depicts a scanning system for scanning a microfluidic device or another industrial sample in accordance with one or more embodiments.

Turning now to a more detailed description of aspects of an embodiment, FIG. 3 depicts a system 300 for performing the automatic analysis of micro-channel cross-sections in accordance with one or more embodiments. The system includes an X-ray source 310, a rotation stage 320, and an X-ray detector 330. The X-ray source 310 is configured to emit radiation through a sample towards the X-ray 330 detector. The X-ray detector 330 measures the amount of radiation that is received to generate an image. It should be understood that different sources of radiation and different types of detectors can be used and is not limited by the example shown in FIG. 3.

Figure 4:
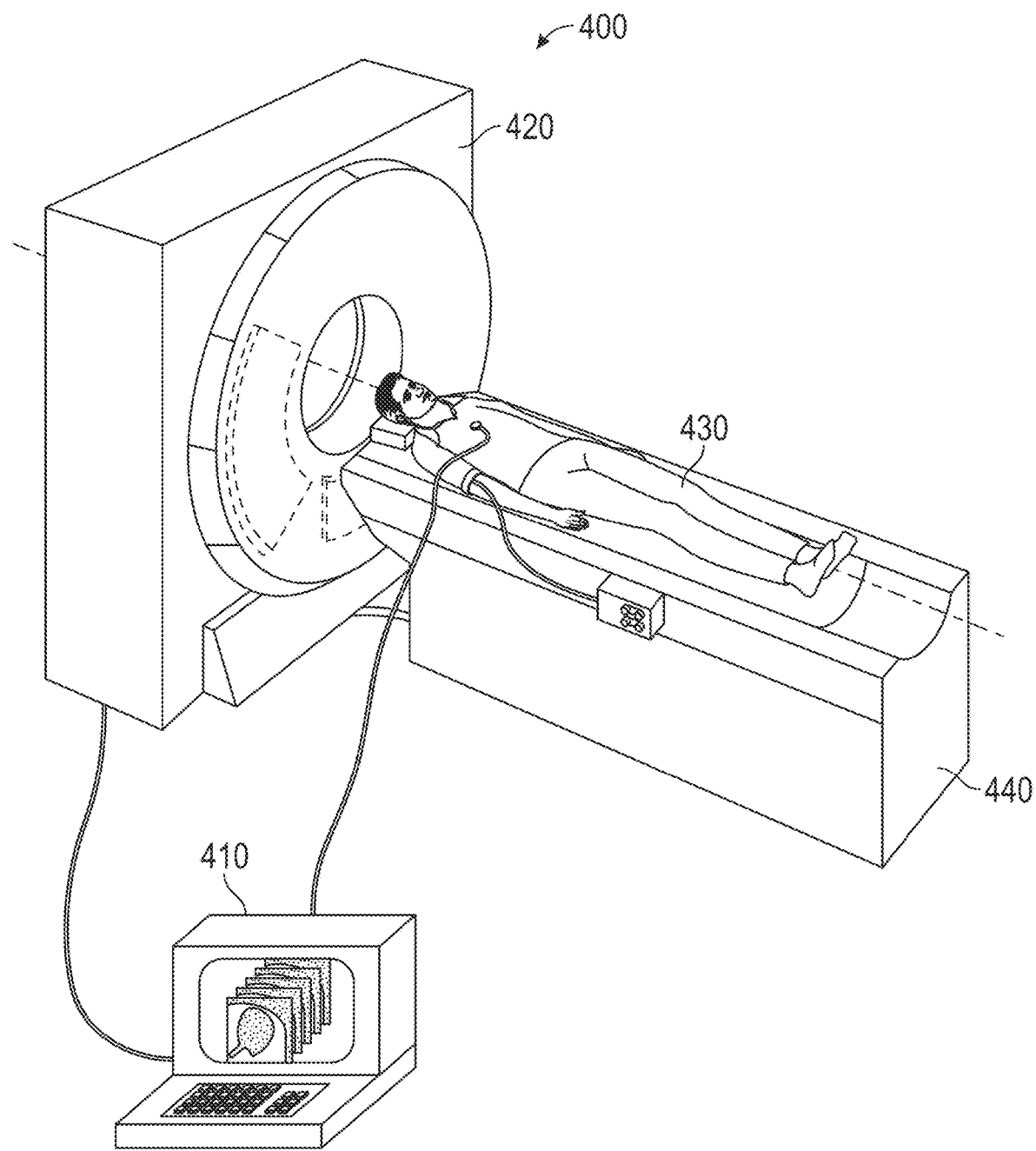
FIG. 4 depicts a scanning system for scanning a patient in accordance with one or more embodiments.

FIG. 4 depicts an example system 400 that is used to obtain physiological scan data of a patient such as that shown in FIG. 2 in accordance with one or more embodiments. The system 400 includes a data acquisition system 410 which is coupled to a scanning system 420 that is configured to perform a scan of a sample. The sample, in this example, is a patient 430 that is lying on a platform 440. The platform is operated to move the patient 430 in to the scanning area of the scanning system 420.

The data acquisition system 410 collect the tomographic data slices of the sample. In one or more embodiments, the data acquisition system 410 can be under the control of computing system 500 such as that shown with reference to FIG. 5. The computing system 500 can be coupled to or integrated within the data acquisition system 410.

In other embodiments, scan data can be input into the computing system 500 as an input file that is to be processed. Each of the slices of the sample obtained from the data acquisition system 410 can be analyzed to determine the cross-section values for an identified channel. Prior to the analysis, the slices are aligned in a direction perpendicular to the channel. The cross-section values can include the maximum and minimum values for the dimensions of the channel, the locations within the channel that are not within a defined specification, or other irregularities/obstructions within the channel that are identified. The computing system 500 can be configured to reconstruct tomographic images from the data collected by the data acquisition system 410 and provided to display a visual representation of the channel. In one or more embodiments, the scan data from the data acquisition system 410 can be stored in memory/storage.

The data acquisition system 410 include a display which can be used to display the scan data or other information associated with the scan data. The data can be displayed in a numerical or graphical format or a combination thereof. For example, an illustration of the channel can be displayed including the minimum and maximum cross-section value for the channel.

Figure 5:
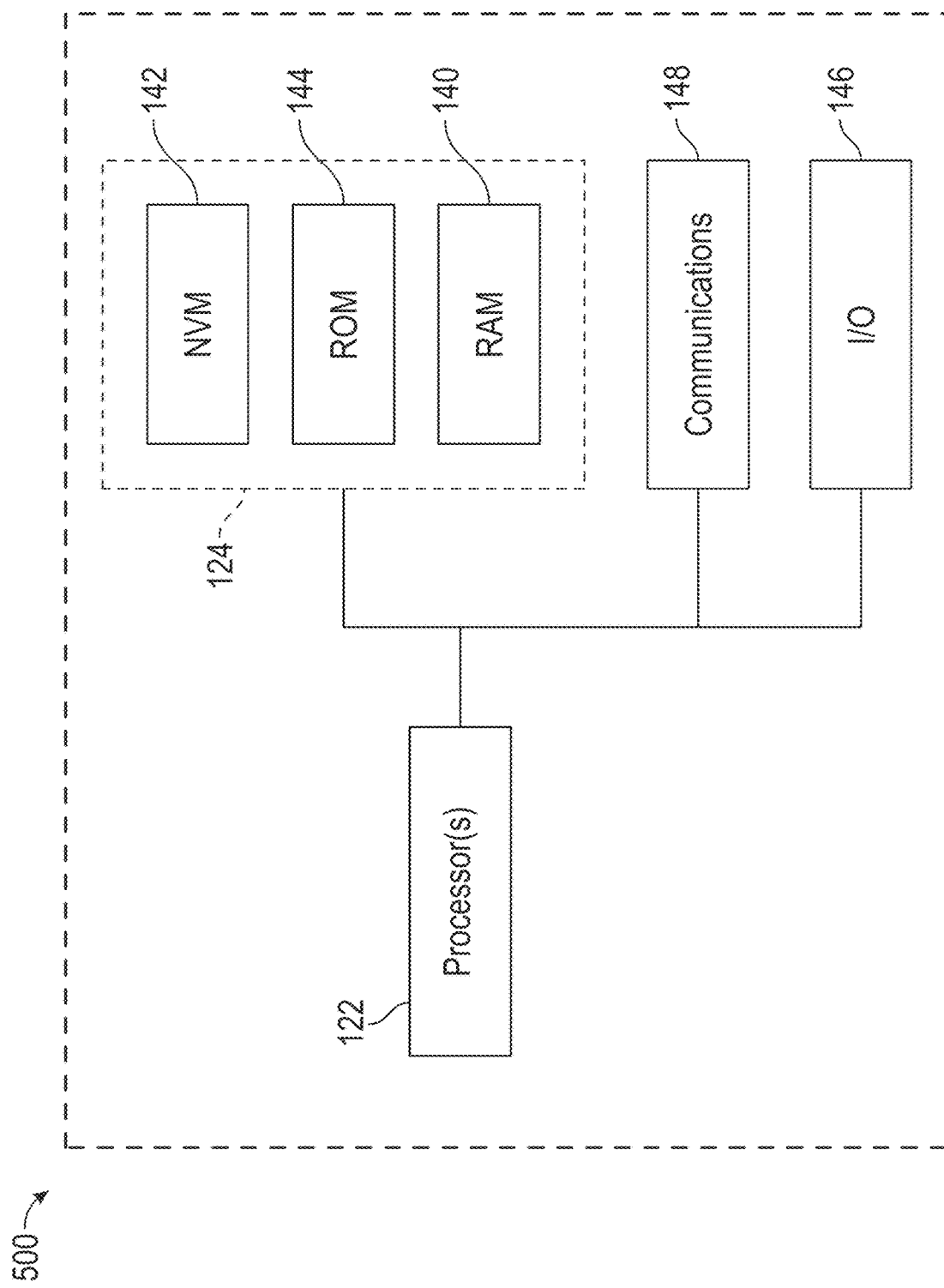
FIG. 5 depicts a computing system used in accordance with one or more embodiments.

Referring now to FIG. 5, the components of the computing system 500 are further described. The computing system 500 is a suitable electronic device capable of accepting data and instructions, executing the instructions to process the data, and presenting the results. The computing system 500 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

The data received by the computing system 500 may be displayed on a user interface or display of the computing system 500. A user interface may be one or more LEDs (light-emitting diodes), an LCD (liquid-crystal diode) display, a CRT (cathode ray tube) display, a touch-screen display or the like. A keypad may also be coupled to the user interface for providing data input to computing system 500. In one embodiment, the user interface is arranged or executed on a mobile computing device that is coupled for communication, such as via a wired or wireless communications medium (e.g. Ethernet, serial, USB, Bluetooth™ or WiFi) for example, to the data acquisition systems 340 or 410.

The computing system 500 may also be coupled to external computer networks such as a local area network (LAN) and the Internet. A LAN interconnects one or more remote computers, which are configured to communicate with controller using a well-known computer communications protocol such as TCP/IP (Transmission Control Protocol/Internet(`) Protocol), RS-232, ModBus, and the like. Additional systems may also be connected to LAN with the computing system 500 in each of these systems being configured to send and receive data to and from remote computers and other systems. The LAN may be connected to the Internet. This connection allows computing system 500 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 148 provides an interface that allows wireless or wired communication with one or more external devices or networks, such as the LAN discussed above.

Terms such as processor, controller, computer, DSP, FPGA are understood in this document to mean a computing device that may be located within an instrument, distributed in multiple elements throughout an instrument, or placed external to an instrument.

Figure 10:
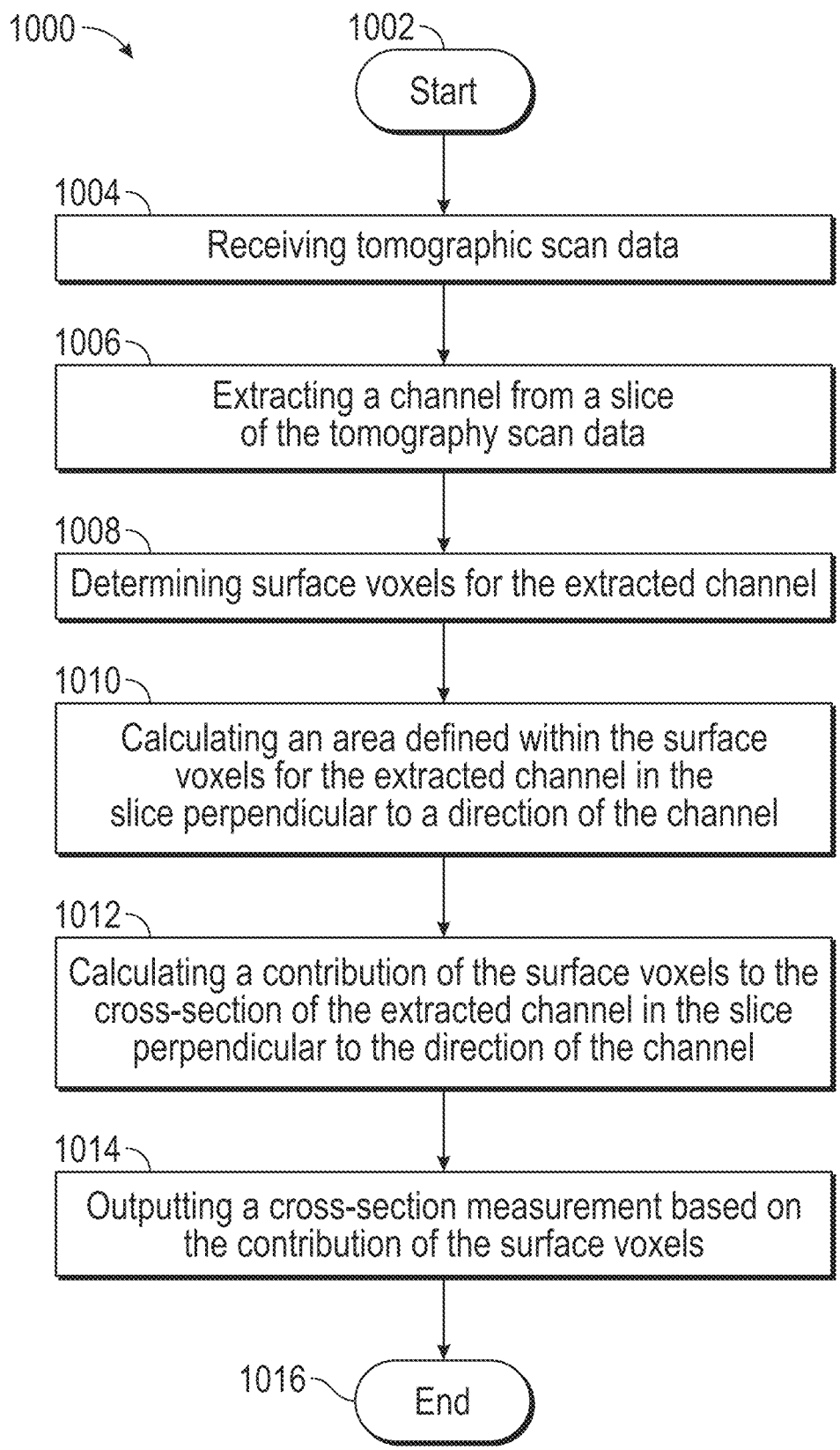
FIG. 10 depicts a flowchart of a method for automated cross-section measurement of microfluidic channels in accordance with one or more embodiments.

The computing system 500 includes operation control methods such as that shown in FIG. 10. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing. It should be understood the computing system 500 is not intended to be limited by the elements shown in FIG. 5 and that other elements can be incorporated into the computing system 500.

Figure 6:
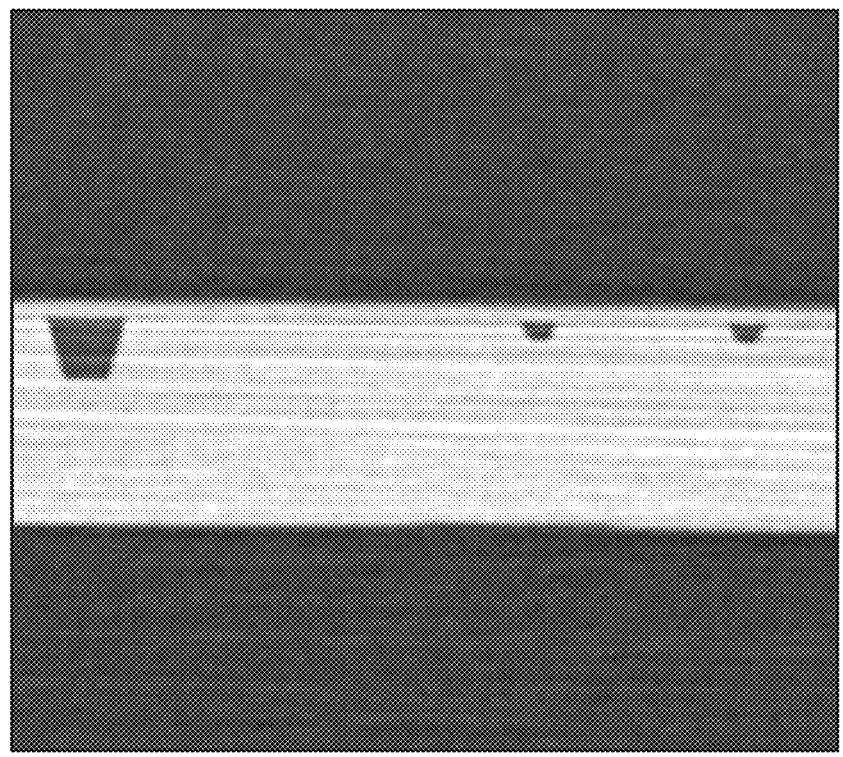
FIG. 6 depicts a CT slice of the microfluidic device with multiple identified channels in accordance with one or more embodiments.

FIG. 6 depicts a CT slice 600 of a sample such as the microfluidic device 100 shown in FIG. 1. The slice includes a number of parallel micro-channels and has been aligned to be perpendicular to the direction of the channels. As shown, three channels have been identified and can be selectively extracted for further analysis by, for example, a computing system 500. The channels can be of various sizes ranging from 10-500 microns, for example. It should also be understood that channels from physiological images such as that shown in FIG. 2 can also be extracted for analysis.

Figure 7:
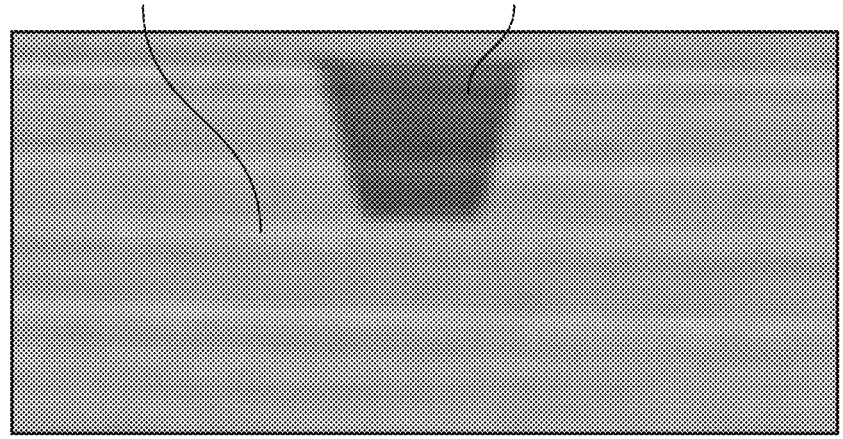
FIG. 7 depicts a cross section of an extracted channel of interest in accordance with one or more embodiments.

Now referring to FIG. 7, a cross-section of an identified channel of interest from the slice 600 of FIG. 6 is shown. The channel 710 is represented by the darker gray shading when compared to the material of the structure 720 enclosing the channel 710 represented by the lighter gray shading.

Each slice obtained from the tomographic scan data has a defined position with respect to the reference coordinate system after aligning the voxel data set. In other words, the location of the slice along the channel can be identified. In the medical context, blood vessel data can be analyzed by the techniques described herein to identify the maximum and minimum blood vessel width or other irregularities that can be measured in the cross-section.

For more irregular structures, like physiological structures or microfluidic channels with turns and branches, the slices can be realigned perpendicular to the direction of the channel after extraction of the individual channels for each position along the channel. In the event that the image is a physiological structure, such as blood vessels, each of the blood vessels can be segmented and approximated to cylinders determining the local channel direction due to the random nature of the blood vessels. The samples of microfluidic devices (e.g. manmade structures) can also be approximated by other geometries depending on the underlying shape of the channels. In one or more embodiments of the invention, the blood vessels can be segmented into a plurality of segments, approximated or fit to a cylinder, and aligned to account for the various branches extending in many directions. In one or more embodiments of the invention, a threshold can be used to determine when the segmentation of the channel should be applied. In some embodiments, the measurements are performed on channels that are on the order of microns.

Figure 8:
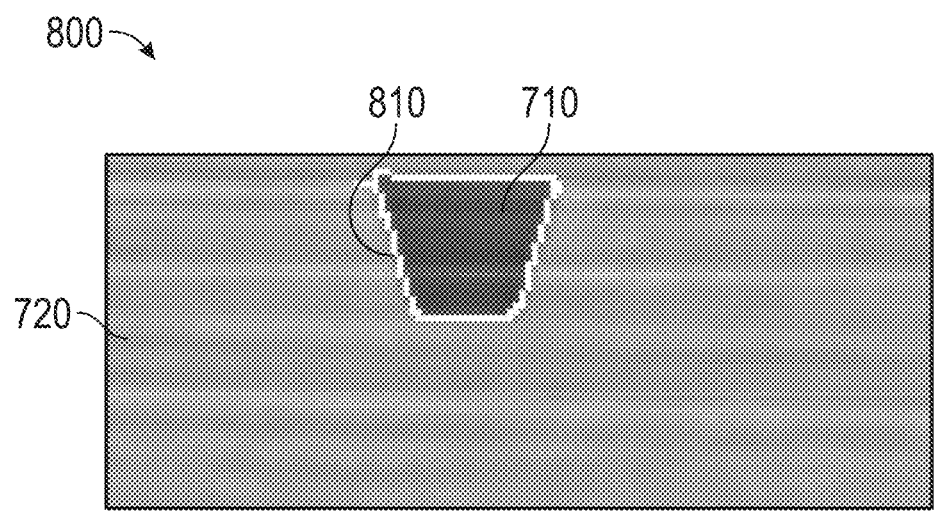
FIG. 8 depicts the surface voxels for the extracted channel in accordance with one or more embodiments.

FIG. 8 depicts the channel 710 of interest that has been extracted for analysis. As shown in FIG. 8, the surface voxels 810, represented by the outlined portion of the channel 710, have been determined for this particular slice of the channel 710 (e.g. the voxels at the interface of the channel and the surrounding structure). The resolution of the surface voxels 810 are limited by the voxel size. Although the surface voxels 810 are shown as a white border surrounding the channel 710 it should be understood this is for ease of illustration. The surface voxels can take on gray scale values from the scan data.

In some embodiments, the surface voxels 810 can range between light gray values and dark gray values. In this example, the light gray can represent the material used for the structure 720 and the dark gray can represent the channel 710. Using this information, not only can the surface voxels 810 be identified but the contribution of the surface voxels 810 to the cross-section can be calculated to provide a more accurate determination for the cross-section of the channel 710. In an embodiment, the contribution of the surface voxel is based on determining the amount, percentage, or ratio of the light gray color to dark gray color.

In one or more embodiments of the disclosure, the area within the defined surface voxels 810 is determined by multiplying the voxel size by the number of voxels within the defined surface voxels 810 for the channel 710.

Figure 9:
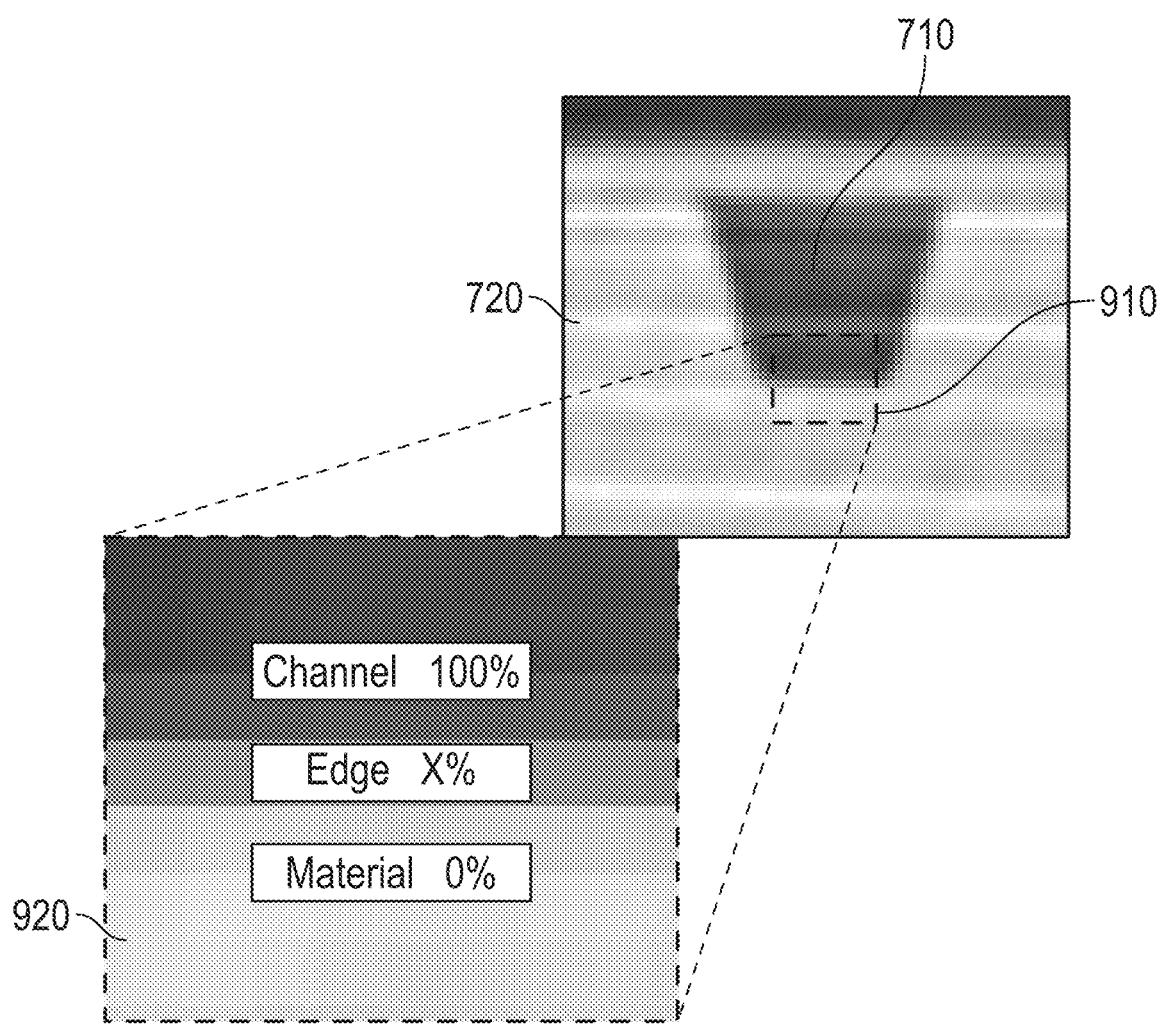
FIG. 9 depicts a detailed representation of the surface voxels of the channel in order to illustrate the method to determine the contribution of the surface voxels to the area within the channel in accordance with one or more embodiments.

FIG. 9 depicts a result of performing further analysis of the slice to determine the contribution of the surface voxels to the cross-section of the channel 710. This provides an accurate measurement for the cross-section of the channel 710. Conventional techniques do not account for the contribution of the surface voxels to the cross-section of the channel and therefore, provides an approximation as opposed to a more precise measurement of the channel cross-section. The cross-section provides desired information for the fluidic properties of the channel and accurate measurements.

As an example, a particular location 910 of the surface voxels is emphasized for further explanation. The surface voxels are one voxel in thickness. It should be understood the resolution can impact the contribution of the surface voxels to the cross-section of the channel. The gray values of the voxels from the tomography scan can be mapped to a particular percentage (%) contribution. As shown in the enlarged view 920 in FIG. 9, the gray values are normalized and mapped to a percentage % contribution to the cross-section. In this example, voxels representing the material forming the structure having a first gray value contribute 0%. A second gray value "X" representing the edge of the channel can contribute "X %" towards the channel cross-section. A third gray value representing the channel contributes 100% towards the cross-section.

In particular, the gray values of the voxel represent the x-ray absorption properties of the material at the position of the voxel which are determined by several material properties including but not limited to the material density. If the voxel is located in the middle of a homogenous material, the voxel will have a gray value that is characteristic for the material. Hence, all voxels inside the channel or inside the material forming the structure will have the same gray value. Variations of the gray values within these regions are usually due to noise. However, at an edge, there can be voxels which cover both a portion of the structure material as well as a portion of the channel. Therefore, their gray values will include a mix of the gray values of the two materials. This mix is determined by the split of the volume between the material and the channel. In a non-limiting example, if the gray value of the material is, e.g., 50000 and the gray value of the channel is, e.g. 20000, the volume of a surface voxel with a gray value of 40000 will consist of one third of the channel and two-thirds material forming the structure. It should be understood that any number of values of the voxels can be mapped to different contribution levels to the channels and is not limited by the example shown in FIG. 9.

Referring now to FIG. 10, a flowchart of a method 1000 for performing automated analysis of a cross-section of a microchannel in accordance with one or more embodiments of the disclosure. The method 1000 begins at block 1002 and continues to block 1004 and receives tomographic scan data for a sample. In one or more embodiments of the disclosure, the sample is a microfluidic device including various chambers and channels.

In one or more embodiments of the disclosure, the tomographic scan data can be loaded into the processor from a file. In other embodiments of the disclosure, the processor can be operably coupled to the scanner or data acquisition system to obtain the tomographic scan data. The tomographic scan data can be used to obtain slices representing cross-sections of the scanned microchannel. Each of the slices can be aligned along the axis of the microchannel and the position of the channel can be maintained for each slice during the analysis.

Block 1006 extracts one or more channels from a slice of the tomography scan data. In some embodiments of the disclosure, the channels range in width and height between 10-500 micrometers. The method 1000 proceeds to block 1008 which determines the surface voxels for the extracted channel. In one or more embodiments, the surface voxels are determined by identifying the voxels with the highest gradient along the direction perpendicular to the local surface as described with reference to FIG. 9.

Block 1010 calculates an area defined within the surface voxels for the extracted channel in the slice perpendicular to a direction of the channel. In one or more embodiments of the disclosure, the area of a single voxel is multiplied by the number of voxels within the area defined by the surface voxels to calculate the area of the channel.

Responsive to calculating the area, block 1012 calculates a contribution of the surface voxels to the cross-section of the extracted channel in the slice perpendicular to the direction of the channel. This step improves the calculated values for the cross-section of the channel by increasing the accuracy of the calculated cross-section. In one or more embodiments of the invention, the contribution of the surface voxels to the channel cross-section is calculated by weighting each voxel of the surface voxels according to its gray value and summing over all of the surface voxels. The value of the contribution of the surface voxel can be used to update the calculated cross-section for the channel.

In one or more embodiments of the disclosure, the measured dimensions can be compared to the expected dimensions for the channel and used to flag positions in the channel or microchannel device that are not within specification. The measured dimensions account for the contribution of the surface voxels to arrive at a more specific and accurate result. The specifications for the channels can be provided to the processor using known techniques including loading data files, parameters, CAD files, etc.

The marked locations of the channel or device can be provided in a numerical or graphical format to indicate locations that are not within the expected values or ranges.

The process can be repeated for each slice for the length of the channel. In one or more embodiments of the invention, the maximum and minimum channel cross-sections can be determined and marked. Each of the channel cross-sections can be calculated and then compared with the other cross-sections of the channel at different locations.

At block 1014, the cross-section measurement that is based on the contribution of the surface voxels of the channel is output. The cross-section data can be output in a numerical format, a graphical format, or a combination thereof. The method 1000 ends at block 1016. It should be understood that disclosure is not intended to be limited by the steps shown by the method 1000. Different steps or a different sequence of steps can be within the scope of the disclosure.

The technical effects and benefits provide an automated analysis of a channel cross-section via computed tomography or MRI. In addition, the technical effects and benefits provide a more accurate measurement for the channel cross-section which allows an analysis of the internal structures of the microfluidic channel and fluidic properties. By automating the extraction of the cross-section data, the consistency and reliability of the results of the examination data can be improved. The improved analysis can also be used to efficiently and accurately mark portions of the channel that are not within specification for further examination.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for performing automatic analysis of cross-sections of micro-channels, the method comprising:
 receiving tomography scan data;
 aligning the tomography scan data;
 extracting channels from a slice of the tomography scan data to create an isolated slice of the extracted channels;
 determining surface voxels for the extracted channels;
 determining an area defined within the surface voxels for each of the extracted channels;
 determining a contribution of the surface voxels for each of the extracted channels to the cross-section of the extracted channels, wherein determining the contribution of the surface voxels to the cross-section of the extracted channels comprises weighting each surface voxel based on its gray value and summing over all surface voxels for the cross-section of the extracted channels; and outputting cross-section information based on the contribution of the surface voxels.

2. The method of claim 1, further comprising determining a cross-section for each position in the extracted channels based on a voxel size and voxel gray values.

3. The method of claim 1, further comprising repeating the method across a length of the extracted channels.

4. The method of claim 3, further comprising marking positions of the extracted channels based at least in part on the determined cross-sections for the length of the extracted channel.

5. The method of claim 3, further comprising determining minimum values and maximum values for the cross-section of the extracted channel.

6. The method of claim 1, wherein the tomography scan data includes scan data of a microfluidic device.

7. The method of claim 1, wherein the tomography scan data includes scan data of a physiological sample.

8. The method of claim 1, further comprising segmenting the extracted channel into a plurality of segments; and
approximating each of the plurality of segments to a geometric shape.

9. The method of claim 8, further comprising aligning a direction of each slice perpendicular to an axis of the channel determined by an axis of the geometric shape approximated to the plurality of segments.

10. A system for performing automatic analysis of cross-sections of micro-channels, the system comprising:
a data acquisition system for obtaining a tomography scan of a channel;
a computing system coupled to the data acquisition system;
a processor coupled to the computing system, wherein the processor is configured to:
receive tomography scan data;
align the tomography scan data;
extract channels from the tomography scan data;
determine surface voxels for the extracted channels;
determine an area defined within the surface voxels for each of the extracted channels;
determine a contribution of the surface voxels to the cross-section of the extracted channel, wherein determining the contribution of the surface voxels to the cross-section of the extracted channels comprises the processor configured to weight each surface voxel based on its gray value and sum over all surface voxels for the cross-section of the extracted channels; and
output a cross-section measurement based on the contribution of the surface voxels.

11. The system of claim 10, wherein the processor is further configured to determine a cross-section for each position in the extracted channels based on voxel size and voxel gray values.

12. The system of claim 10, further comprising the processor configured to repeat the method across a length of the extracted channels.

13. The system of claim 12, further comprising the processor configured to mark critical positions of each of the extracted channels based at least in part on the determined cross-sections for the length of the extracted channels.

14. The system of claim 12, further comprising the processor configured to determine minimum values and maximum values for the cross-section of the extracted channels.

15. The system of claim 10, wherein the tomography scan data includes scan data of a microfluidic device.

16. The system of claim 10, wherein the tomography scan data includes scan data of a physiological sample.

17. The system of claim 10, further comprising the processor configured to segment the channel into a plurality of segments; and
approximate each of the plurality of segments to a geometric shape.

18. The system of claim 17, wherein aligning the tomography scan data comprises aligning a direction of each slice perpendicular to an axis of the channel determined by an axis of the geometric shape approximated to the plurality of segments.

* * * * *